US008731622B2

(12) United States Patent
Kanade et al.

(10) Patent No.: US 8,731,622 B2
(45) Date of Patent: May 20, 2014

(54) METHOD AND APPARATUS FOR SYSTEM ACQUISITION WHILE MAINTAINING A DEFINED BATTERY LIFE SPAN

(75) Inventors: Parag M. Kanade, San Diego, CA (US); Alex K. Tu, San Diego, CA (US); Virat Deepak, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 1261 days.

(21) Appl. No.: 12/126,840

(22) Filed: May 23, 2008

(65) Prior Publication Data

US 2009/0289601 A1 Nov. 26, 2009

(51) Int. Cl.
*H04B 1/38* (2006.01)

(52) U.S. Cl.
USPC .......................... 455/572; 455/343.1; 455/574

(58) Field of Classification Search
CPC .............. H04B 1/1607; H04W 52/02; H04W 52/0229; H04W 52/0216; H04W 52/0245
USPC ................. 455/343.1–343.6, 127.5, 572–574
See application file for complete search history.

(56) References Cited

U.S. PATENT DOCUMENTS

| | | | |
|---|---|---|---|
| 5,535,442 A * | 7/1996 | Kishi | 455/184.1 |
| 5,565,759 A | 10/1996 | Dunstan | |
| 5,596,571 A * | 1/1997 | Gould et al. | 455/574 |
| 5,794,146 A * | 8/1998 | Sevcik et al. | 455/434 |
| 6,535,752 B1 * | 3/2003 | Dent | 455/343.1 |
| 6,957,068 B2 | 10/2005 | Hutchison, IV et al. | |
| 7,844,308 B2 * | 11/2010 | Rhee et al. | 455/343.2 |
| 7,904,060 B2 * | 3/2011 | Krause | 455/414.1 |
| 7,953,401 B2 * | 5/2011 | Hutchison et al. | 455/343.5 |
| 7,962,135 B2 | 6/2011 | Cooper | |
| 8,295,893 B2 * | 10/2012 | Rao et al. | 455/343.1 |
| 2001/0024968 A1 * | 9/2001 | Gibbons et al. | 455/574 |
| 2001/0053710 A1 * | 12/2001 | Gibbons et al. | 455/574 |
| 2004/0063427 A1 | 4/2004 | Narasimha et al. | |
| 2004/0077383 A1 * | 4/2004 | Lappetelainen et al. | 455/574 |
| 2004/0192328 A1 * | 9/2004 | Giacalone et al. | 455/455 |
| 2004/0203745 A1 | 10/2004 | Cooper | |
| 2004/0235475 A1 | 11/2004 | Ishii | |

(Continued)

FOREIGN PATENT DOCUMENTS

| | | |
|---|---|---|
| CN | 101088253 A | 12/2007 |
| EP | 1236370 | 2/2006 |

(Continued)

OTHER PUBLICATIONS

International Search Report and Written Opinion—PCT/US2009/044572, International Search Authority—European Patent Office—Aug. 10, 2009.

(Continued)

*Primary Examiner* — Lana N Le
(74) *Attorney, Agent, or Firm* — Won Tae Kim

(57) ABSTRACT

A method and an apparatus for system acquisition at a wireless device while maintaining a predetermined battery life span, include determining a level of remaining battery power upon entering an out of service state. A duty cycle, comprising a search time and sleep time, of acquisition attempts is determined such that the level of remaining battery power lasts for the defined battery life span. The duty cycle is determined by adjusting at least one of the search time and the sleep time, depending on how long the remaining battery power is required to last.

81 Claims, 8 Drawing Sheets

(56) References Cited

U.S. PATENT DOCUMENTS

| | | | |
|---|---|---|---|
| 2004/0266386 A1* | 12/2004 | Kuo | 455/343.1 |
| 2005/0060319 A1 | 3/2005 | Douglas et al. | |
| 2006/0068832 A1* | 3/2006 | Islam et al. | 455/528 |
| 2006/0079224 A1 | 4/2006 | Welnick et al. | |
| 2006/0119508 A1* | 6/2006 | Miller | 455/127.5 |
| 2006/0199582 A1 | 9/2006 | Giacalone | |
| 2007/0032233 A1 | 2/2007 | Tajima et al. | |
| 2007/0149193 A1* | 6/2007 | Chong | 455/435.2 |
| 2009/0291663 A1 | 11/2009 | Schultz et al. | |
| 2009/0291683 A1 | 11/2009 | Kanade et al. | |
| 2010/0009643 A1* | 1/2010 | Haartsen | 455/127.5 |
| 2010/0311473 A1* | 12/2010 | Deshpande et al. | 455/573 |
| 2011/0130140 A1* | 6/2011 | Fadell | 455/435.2 |

FOREIGN PATENT DOCUMENTS

| | | |
|---|---|---|
| EP | 1679914 A1 | 7/2006 |
| GB | 2328588 A | 2/1999 |
| JP | 2000507756 A | 6/2000 |
| JP | 2003023665 A | 1/2003 |
| JP | 2003519997 A | 6/2003 |
| JP | 2003264565 A | 9/2003 |
| JP | 2006521770 A | 9/2006 |
| JP | 2008141259 A | 6/2008 |
| JP | 2008532423 A | 8/2008 |
| RU | 2137305 C1 | 9/1999 |
| RU | 2215378 | 10/2003 |
| WO | WO9529568 A1 | 11/1995 |
| WO | 9736443 A1 | 10/1997 |
| WO | 0150788 A1 | 7/2001 |
| WO | 2004089031 A2 | 10/2004 |
| WO | WO2006093882 | 9/2006 |
| WO | WO2008040025 A1 | 4/2008 |
| WO | WO2008052123 | 5/2008 |

OTHER PUBLICATIONS

Taiwan Search Report—TW098116766—TIPO—Jun. 11, 2012.

* cited by examiner

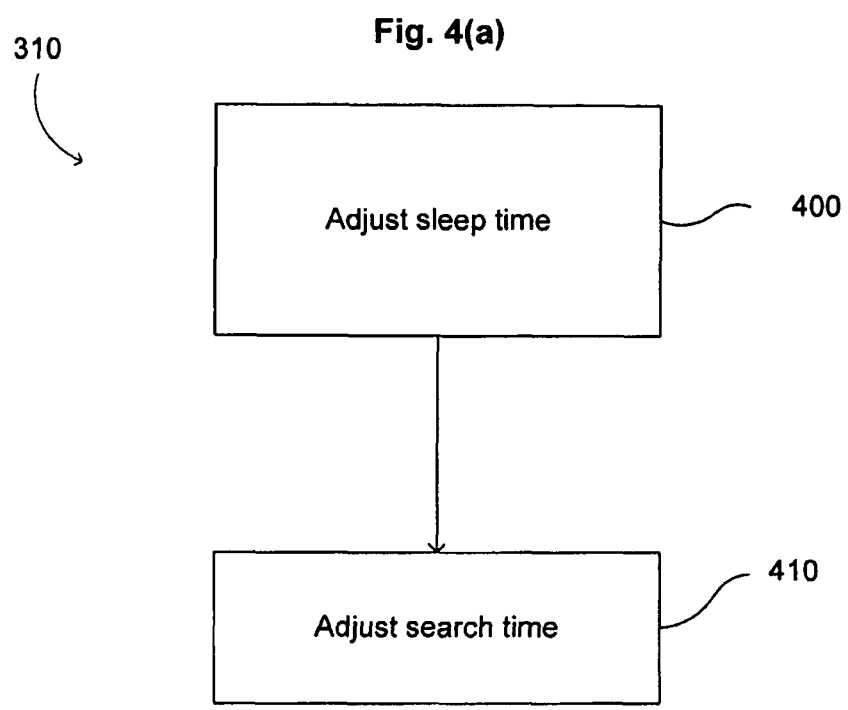

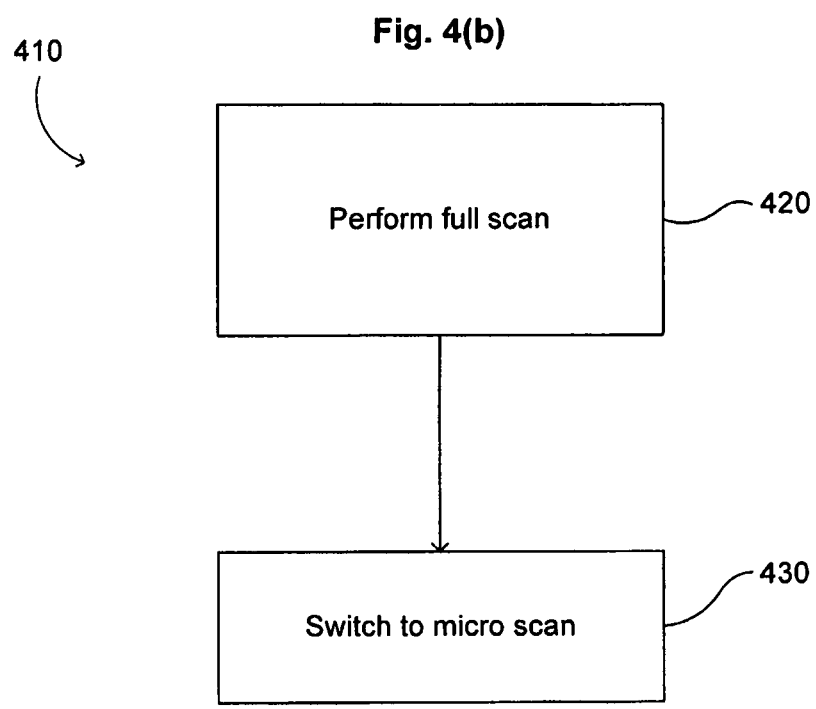

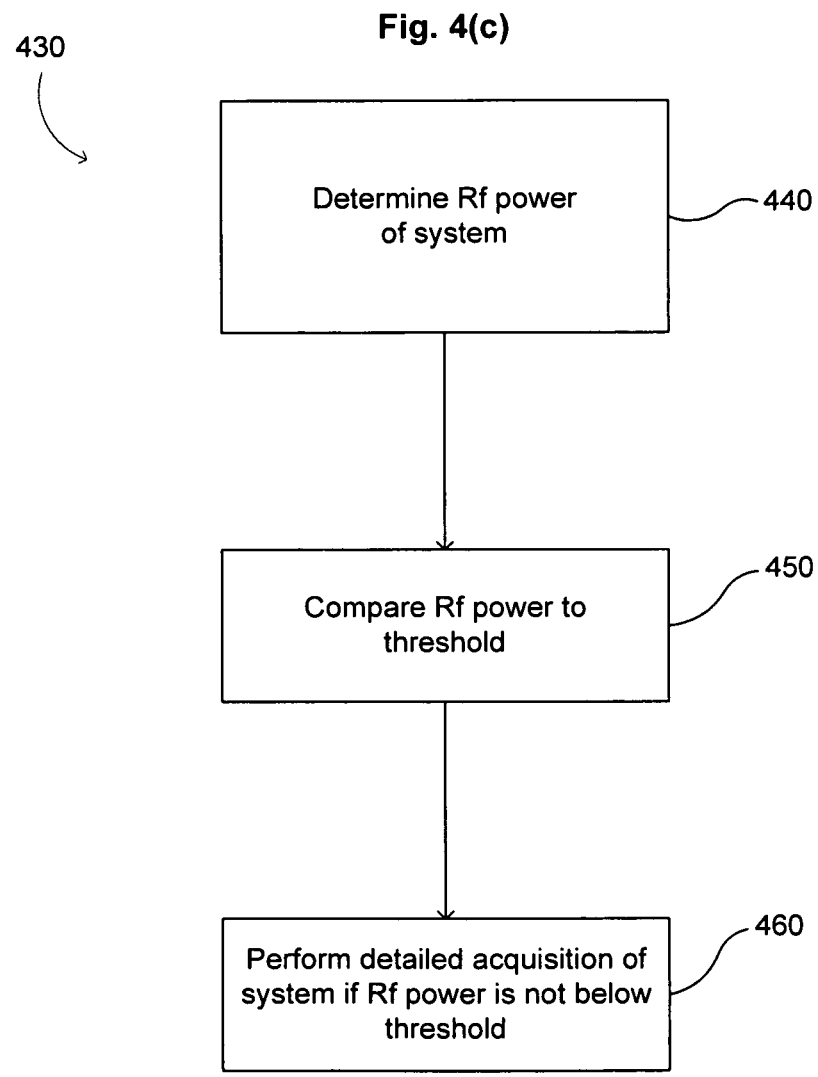

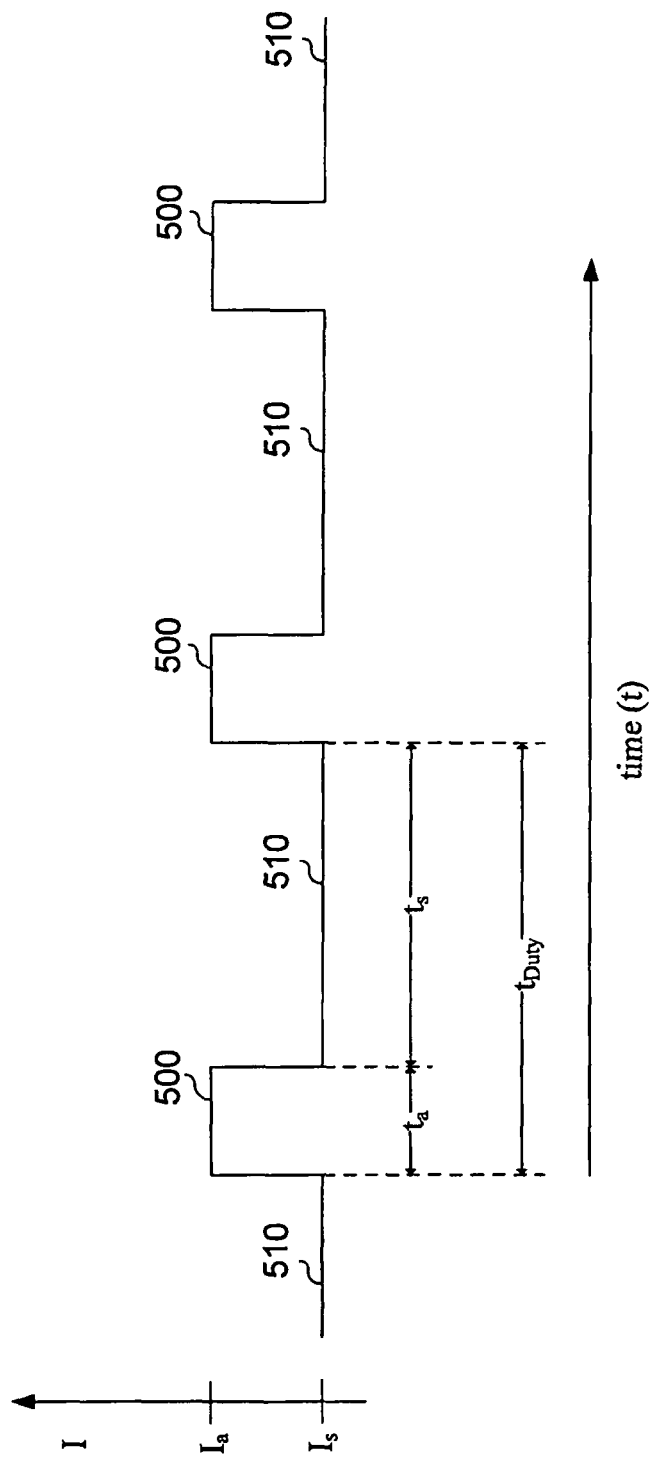

METHOD AND APPARATUS FOR SYSTEM ACQUISITION WHILE MAINTAINING A DEFINED BATTERY LIFE SPAN

BACKGROUND

1. Field

The present disclosure relates generally to acquisition of a system in a communication device, and more specifically to controlling battery life span in a communication device.

2. Background

Battery performance of a mobile device depends on the amount of time spent in different operational modes. For example, typical mobile device operation modes include traffic states (i.e., voice and data transmissions) and idle states, which may be while the mobile device is in-service or out of service.

When a mobile device loses service, significant power is consumed during the re-acquisition of service. Re-acquisition may require multiple attempts to use multiple systems, which may or may not be usable. Depending on a power level remaining in a battery of the mobile device, the mobile device may not locate a usable system before the battery dies.

Current out of service methods are dependent on RF/channel conditions which leads to unpredictable battery power performance. Due to the dependence of the current methods on the RF/channel conditions, standby time estimation is difficult. Unpredictable standby time leads to user dissatisfaction due to unpredictable power consumption and battery life spans.

Conventional methods continue to search and sleep at a constant frequency when service is lost, even when battery power is low. Thus, it is likely that the battery will die quickly, before the mobile device is able to re-acquire service. Therefore, there is a need in the art for a system and method that achieves a predictable battery life span, thereby improving re-acquisition performance when a mobile device is out of service.

SUMMARY

The presently disclosed embodiments are directed to solving one or more of the problems, described above, as well as providing additional features that will become readily apparent by reference to the following detailed description when taken in conjunction with the accompanying drawings.

One aspect of the disclosure is directed to a method of system acquisition for a wireless device while maintaining a defined battery life span. The method includes determining a level of remaining battery power upon entering a defined state; and setting a duty cycle of acquisition attempts such that the level of remaining battery power lasts for the defined battery life span while the wireless device is in the defined state. According to certain aspects, the defined state may be an out of service state, for example.

Another aspect of the disclosure is directed to an apparatus for system acquisition for a wireless device while maintaining a defined battery life span. The apparatus includes a power control unit configured to determine a level of remaining battery power upon entering a defined state; and a processor configured to set a duty cycle of acquisition attempts such that the level of remaining battery power lasts for the defined battery life span while the wireless device is in the defined state. According to certain aspects, the state may be an out of service state, for example.

Yet another aspect of the disclosure is directed to an apparatus for system acquisition for a wireless device while maintaining a defined battery life span. The apparatus includes means for determining a level of remaining battery power upon entering a defined state; and means for setting a duty cycle of acquisition attempts such that the level of remaining battery power lasts for the defined battery life span while the wireless device is in the defined state. According to certain aspects, the state may be an out of service state, for example.

Yet another aspect of the disclosure is directed to a computer-readable medium storing instructions thereon for system acquisition for a wireless device while maintaining a defined battery life span. The instructions include determining a level of remaining battery power upon entering a defined state; and setting a duty cycle of acquisition such that the level of remaining battery power lasts for the defined battery life span while the wireless device is in the defined state. According to certain aspects, the state may be an out of service state, for example.

Yet another aspect of the disclosure is directed to a processor configured to execute instructions for system acquisition for a wireless device while maintaining a defined battery life span. The instructions include determining a level of remaining battery power upon entering a defined state; and setting a duty cycle of acquisition attempts such that the level of remaining battery power lasts for the defined battery life span while the wireless device is in the defined state. According to certain aspects, the state may be an out of service state, for example.

Determining a duty cycle such that the level of remaining battery power lasts for the predetermined battery life span ensures predictable battery consumption regardless of the RF/channel conditions, while providing good system acquisition performance. Ensuring a predictable battery life span may allow a user of the wireless device to change his or her location before the battery dies, or temporarily turn off the wireless device until the user's location has changed, thereby increasing the possibility of later acquiring a system after service is lost, for example.

It is to be understood that both the foregoing general description and the following detailed description are exemplary and are intended to provide further explanation of the claimed subject matter.

BRIEF DESCRIPTION OF THE DRAWINGS

The features, nature and advantages of the present disclosure will become more apparent from the detailed description set forth below when taken in conjunction with the drawings in which like reference characters identify correspondingly throughout and wherein:

FIG. 4(*a*) is a flow diagram illustrating a method of determining a duty cycle for acquisition attempts, according to certain aspects of the present disclosure.

FIG. 4(*b*) is a flow diagram illustrating a method of adjusting a search time of a duty cycle, according to certain aspects of the present disclosure.

FIG. 4(*c*) is a flow diagram illustrating a method of switching to a micro scan, according to certain aspects of the present disclosure.

FIG. 5 is a waveform of a plurality of duty cycles, showing current with respect to time, according to certain aspects of the present disclosure.

DETAILED DESCRIPTION

Figure 1:
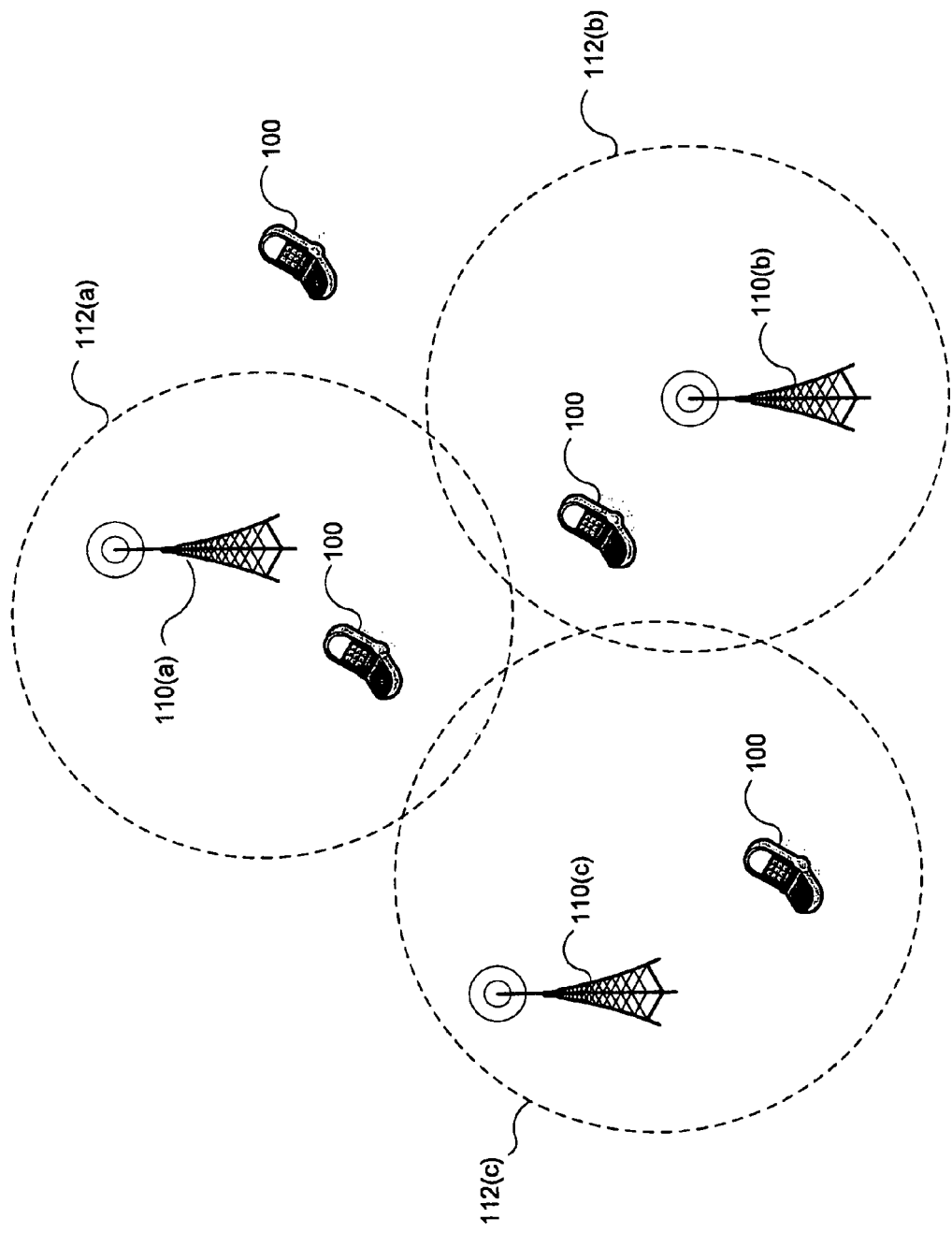
FIG. 1 is a schematic of wireless devices acquiring service from various wireless systems, according to certain aspects of the present disclosure.

In the following detailed description, numerous specific details are set forth to provide a full understanding of the subject technology. It will be obvious, however, to one ordinarily skilled in the art that the subject technology may be practiced without some of these specific details. In other instances, well-known structures and techniques have not been shown in detail so as not to obscure the subject technology.

The word "exemplary" is used herein to mean "serving as an example or illustration." Any aspect or design described herein as "exemplary" is not necessarily to be construed as preferred or advantageous over other aspects or designs.

Reference will now be made in detail to aspects of the subject technology, examples of which are illustrated in the accompanying drawings, wherein like reference numerals refer to like elements throughout.

It should be understood that the specific order or hierarchy of steps in the processes disclosed herein is an example of exemplary approaches. Based upon design preferences, it is understood that the specific order or hierarchy of steps in the processes may be rearranged while remaining within the scope of the present disclosure. The accompanying method claims present elements of the various steps in a sample order, and are not meant to be limited to the specific order or hierarchy presented.

FIG. 1 is a schematic of a plurality of wireless devices acquiring service from various wireless systems, according to certain aspects of the present disclosure. As depicted in FIG. 1, wireless device 100 acquire service from one of the wireless communication systems 110(a)-110(c), when within respective coverage areas 112(a)-112(c). A wireless device 100 may move in and out of coverage areas 112(a)-112(c), thereby losing service to the wireless communication system 110(a)-110(c) from which the wireless device 100 leaves. The wireless device 100 must then acquire service via a channel utilized by a wireless communication system 110(a)-110(c) whose respective coverage area 112(a)-112(c) the wireless device 100 enters. Wireless devices 100 may refer to, for example, cellular phones, PDAs or the like, and may also be called mobile devices, user equipment (UE), wireless communication devices, terminals, stations, mobile stations, mobile equipment (ME) or some other terminology.

Figure 2:
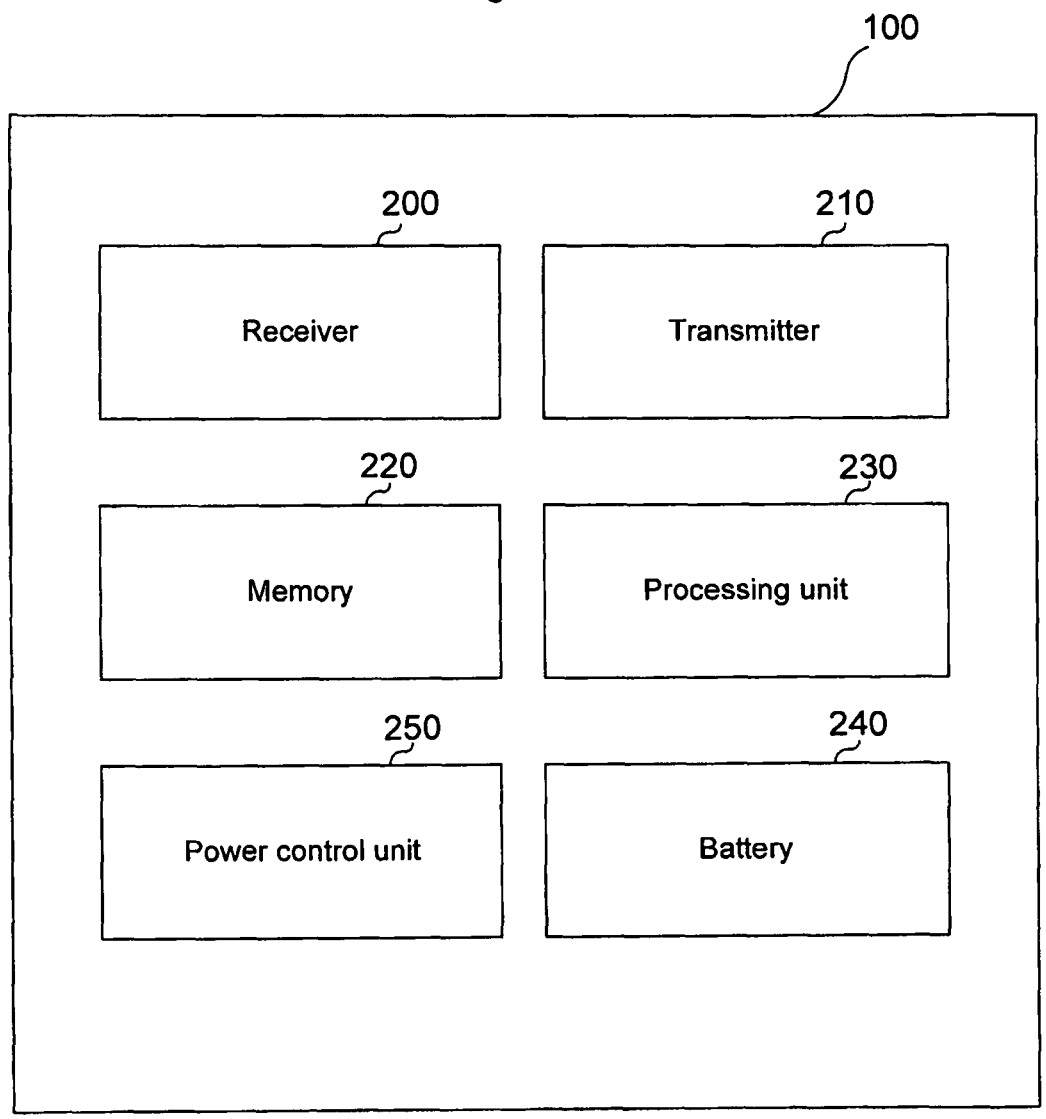
FIG. 2 is an exemplary diagram of a wireless device, according to certain aspects of the present disclosure.

FIG. 2 is an exemplary diagram of a wireless device 100, according to certain aspects of the present disclosure. According to certain aspects, wireless device 100 includes a receiver 200 and a transmitter 210. The wireless device 100 further includes a memory 220, a processing unit 230, a battery 240 and a power control unit 250. Of course, the wireless device 100 is not limited to any particular configuration, and various combinations of components, as well as other components, may be included in the wireless device 100.

Figure 3:
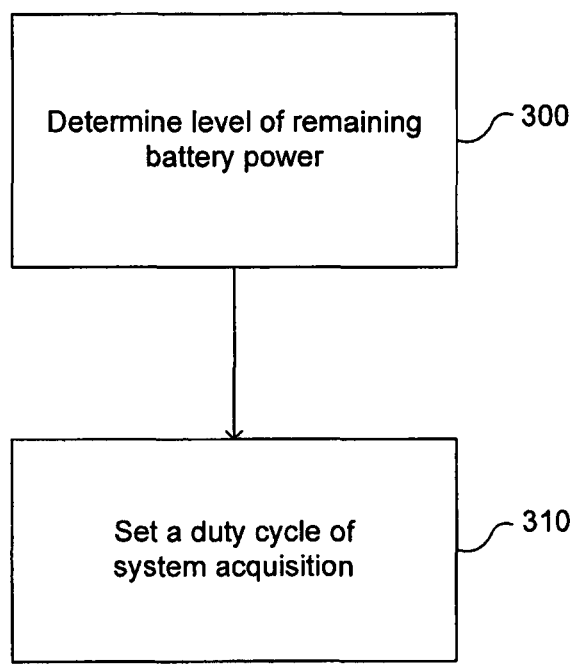
FIG. 3 is a flow diagram illustrating a method for acquisition attempts at a wireless device while maintaining a predetermined battery life span, according to certain aspects of the present disclosure.

FIG. 3 is a flow diagram illustrating a method of system acquisition at a wireless device while maintaining a defined battery life span, according to certain aspects of the present disclosure. Referring now to FIG. 3, at operation 300 the level of remaining battery power is determined. Any conventional mechanism may be employed by power control unit 250, for example, to determine how much battery power has been consumed and/or how much battery power remains in the battery 240. Processing unit 230 may be used to determine the level of remaining battery power in addition to power control unit 250 or as an alternative.

From operation 300, the process continues to operation 310 where a duty cycle of acquisition attempts is determined so that the level of remaining battery power will last for the defined battery life span. According to certain aspects of the disclosure, the duty cycle includes a search time and a sleep time. During the search time, the wireless device 100 searches for a usable system by implementing various possible scanning modes (described in detail with reference to FIGS. 4(a)-4(c) below). As an example, when the battery 240 is fully charged, the search time of the duty cycle may last for 5 seconds and the sleep time may last for 36 seconds. However, various sleep times and search times may be used to make up a duty cycle without departing from the scope of the present disclosure.

The defined battery life span may be pre-programmed into the wireless device 100 and stored in memory 220. Alternatively, the defined life span may be dynamic such that the remaining battery power will last the same amount of time as if it were fully charged and the wireless device 100 was performing a conventional duty cycle comprising a search time of 5 seconds and a sleep time of 36 seconds, for example. As another alternative, the defined life span may be defined by a user at various times. For example, a user may desire to extend the battery life span if he or she is in a remote location where acquiring a system is improbable. If the user wants to aggressively reacquire service the user may choose to decrease the defined life span in order to reacquire service faster, according to certain aspects.

The duty cycle is determined by adjusting at least one of the sleep time and the search time. FIG. 4(a) is a flow diagram illustrating a method of determining a duty cycle of a channel search, according to certain aspects of the present disclosure. Referring now to FIG. 4(a), at operation 400 the sleep time is adjusted (e.g., lengthened) so that there is more low-power sleep time with respect to the search time. Therefore, in a given period of time, fewer search times will exist, thereby extending the remaining battery power life span.

According to certain aspects, from operation 400 the process may proceed to operation 410, where the search time is adjusted (e.g., shortened) so that there is less higher-power search time with respect to the sleep time. Therefore, in a given time period, less time will be spent searching (i.e., operating a higher power level), thereby extending the remaining battery power life span.

Of course, the method illustrated in FIG. 4(a) is only one example, and a skilled artisan would realize that either the sleep time or the search time may be adjusted individually to obtain the desired duty cycle. Alternatively, both the sleep time and the search time may be adjusted, without departing from the scope of the present disclosure.

As noted above, during the search time, the wireless device 100 searches for a usable system. Acquisition searches can be performed in different modes. For example, the modes may include full scan and/or micro scan. Full scan is more reliable but comes at the cost of increased power and time. Micro scan searches might miss certain weak systems but consume less time and power.

A micro scan is typically a fast scan (e.g., lasting about 10 ms), in which a radio frequency (RF) power of a channel is determined by the power control unit 250 and/or the processing unit 230. The processing unit 230 then determines whether the RF power of the channel is below a predetermined threshold, and if the RF power of the channel is not below the predetermined threshold, the wireless device 100 attempts to acquire service via the channel, using a detailed acquisition of the channel such as a full scan described below.

A full scan is typically a slow scan (e.g., lasting about 300 ms), which generally requires more power than a micro scan. In a full scan, the wireless device 100 attempts to acquire service via one or a plurality of channels, without determining the RF power of the one or a plurality of channels. That is, the processing unit 230 performs a detailed acquisition of the one or a plurality of channels, regardless of the conditions of the channels.

FIG. 4(*b*) shows an exemplary flow diagram illustrating a method of adjusting a search time of a duty cycle, as performed at operation 410, according to certain aspects of the present disclosure. Referring to FIG. 4(*b*), at operation 420, the wireless device 100 may implement a full scan over a limited number of channels (e.g., 5 channels). From operation 420, the process may continue to operation 430 in which the wireless device 100 switches to a faster, more power efficient, micro scan for other channels in order to conserve remaining battery power. It is noted that either a micro scan or a full scan may be performed during the entire search time, or a combination thereof may be performed during the search time.

FIG. 4(*c*) shows an exemplary flow diagram illustrating a method of switching to a micro scan, as performed at operation 430, according to certain aspects of the present disclosure. Referring now to FIG. 4(*c*), at operation 440, an RF power of a channel is determined by the power control unit 250 and/or the processing unit 230. From operation 440, the process proceeds to operation 450, wherein the processing unit 230 determines whether the RF power of the channel is below a predetermined threshold.

From operation 450, the process proceeds to operation 460, where, if the RF power of the channel is not below the predetermined threshold, the wireless device 100 attempts to acquire service via the channel, using a detailed acquisition of the channel such as a full scan described above. Of course, any detailed acquisition of the channel may be performed.

FIG. 5 is a waveform of a plurality of duty cycles, showing current with respect to time, according to certain aspects of the present disclosure. FIG. 5 shows search times 500 at which the wireless device 100 uses current $I_a$ for a time $t_a$. During the sleep times 510, the wireless device 100 uses current $I_s$ for a time $t_s$. One duty cycle lasts for a time $t_{Duty}$, which is equal to $t_a + t_s$.

An average current $I_{avg}$ used by the wireless device 100 during one duty cycle (i.e., $t_{Duty}$) is equal to the total charge used during the search time $t_a$ and the sleep time $t_s$ divided by the duty cycle time $t_{Duty}$ (i.e., $t_a + t_s$), and is expressed by equation (1):

$$I_{avg} = \frac{I_a \times t_a + I_s \times t_s}{t_a + t_s} \tag{1}$$

Moreover, as shown in equation (2), $T_{avg}$ is equal to the total charge remaining $Q_{Rem}$ within battery 240 divided by $t_{total}$, which is a predetermined time, saved in memory 220, that the battery 240 should last before dying.

$$I_{avg} = \frac{Q_{Rem}}{t_{Total}} \tag{2}$$

As an illustrative example, $t_a$ may be fixed at 5 seconds. Therefore, $t_s$ would have to be lengthened, thereby lengthening $t_{Duty}$, so that fewer search times 500 will occur, but the battery 240 will last for $t_{Total}$. Solving for $t_s$ using equation (1), $t_s$ can be determined as shown in equation (3).

$$t_s = \left[\frac{I_a \times t_a + I_s \times t_s}{I_{avg}}\right] - t_a \tag{3}$$

Substituting equation (2) for Iavg of equation (3), $t_s$ can be determined as shown in equation (4).

$$t_s = \left[\frac{[I_a \times t_a + I_s \times t_s]t_{Total}}{Q_{Rem}}\right] - t_a \tag{4}$$

Of course, adjusting time $t_s$ of the sleep time 510 is only one possible way of determining the duty cycle, and $t_a$ may be adjusted in a similar manner in addition to any adjustment to $t_s$ or as an alternative.

Figure 6:
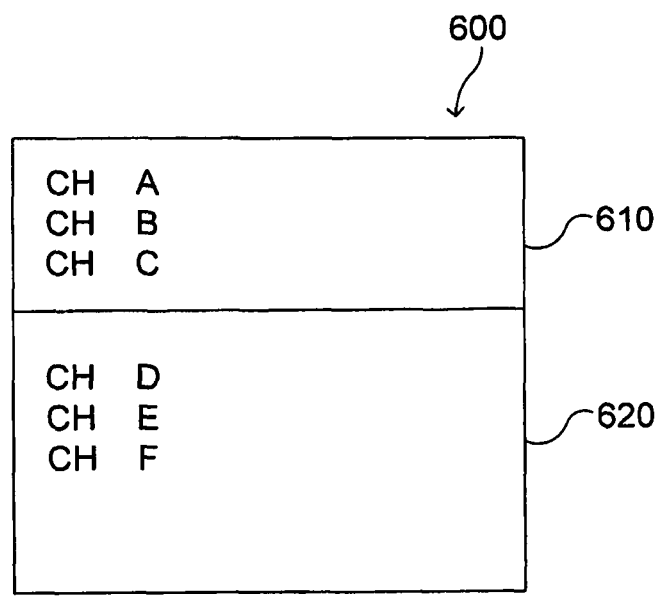
FIG. 6 is an exemplary preferred roaming list stored in a wireless device, according to certain aspects of the present disclosure.

During time $t_a$ of the search time 500, the wireless device 100 may perform the full scan and/or the micro scan, as described above with reference to FIG. 3. In order to efficiently determine which channels to attempt to acquire using either the full scan or micro scan, the wireless device 100 may include a preferred roaming list stored in memory 220 of the wireless device 100. FIG. 6 is an exemplary preferred roaming list 600 stored in the memory 220 of the wireless device 100, according to certain aspects of the present disclosure.

The preferred roaming list 600 may include a most recently used (MRU) list 610, which includes channels A, B and C, which have been recently acquired by the wireless device 100. Generally, the channels on the MRU list 610 are given higher priority and, thus, are chosen first for the full scan and/or micro scan. According to certain aspects, the wireless device 100 may perform a smart puncturing of channels on the MRU list 610 at predetermined intervals during time $t_a$ of the search time 500. If an attempt to acquire the channels on the MRU list 610 is unsuccessful, full and/or micro scans of channels D, E and F on the secondary list 620 may be performed. Of course, the MRU list 610 and the secondary list 620 of the preferred roaming list 600 may include any number of channels.

All channels A, B, C, D, E and F can be pre-programmed into the preferred roaming list 600 and stored in the memory 220. Channels on both the MRU list 610 and the secondary list 620 may be ordered based on channel/RF signal strength, such that the channels with the highest RF power are given highest priority on the preferred roaming list 600, for example. As described above with reference to FIG. 3, the RF power may be determined for each channel before attempting to acquire a channel, and a detailed acquisition will only be attempted for channels with an RF power above a predetermined threshold.

For further battery power conservation, during a search time 500 a full scan may be limited to only channels with the highest priority on the preferred roaming list 600 (e.g., channels on the MRU list 610). If channel acquisition is unsuccessful using the full scans, a micro scan may be performed on the remaining channels on the preferred roaming list 600 (e.g., channels on the secondary list 620).

In addition, the channels on both the MRU list 610 and the secondary list 620 may be ordered based on geographical information. For example, the geographic location of systems employing each respective channel may be pre-programmed and stored in the memory 220. The location of each system may be compared to the location of the wireless device 100, and the closest systems may be given the highest priority on the preferred roaming list 600, for example. The location of the wireless device 100 may be determined using any conventional locating mechanism, such as a global positioning system (GPS), for example.

When service to the wireless device 100 is lost, for example, a duty cycle may be determined by adjusting time $t_a$ of search time 500 and/or time $t_s$ of sleep time 510, such that the battery 240 will last for a defined length of time. The present disclosure is not limited to the scenario where the wireless device 100 loses service. The features of the present disclosure may be implemented when channel conditions of a currently utilized channel are poor (e.g., the channel conditions fall below a defined threshold) and a different channel with better conditions is desired. Additionally, a user of the wireless device 100 may manually initiate the channel acquisition methods described herein when a different channel is desired.

The capability of determining the duty cycle ensures predictable battery consumption regardless of the RF/channel conditions, while providing good system acquisition performance.

By decreasing the frequency of search times 500, for example, the life span of the battery 240 will be increased, since less power is consumed during sleep times 510. Ensuring a predictable battery life span may allow a user of the wireless device 100 to change his or her location, thereby increasing the possibility of acquiring a system used by another wireless communication system once service is lost.

Those of ordinary skill in the art would understand that the information and signals may be represented using any of a variety of different technologies and techniques. For example, data, instructions, commands information signals, bits, symbols, and chips that may be referenced throughout the above description may be represented by voltages, currents, electromagnetic waves, magnetic fields or particles, optical fields or particles, or any combination thereof.

Those of ordinary skill would further appreciate that the various illustrative logical modules, circuits and algorithms described in connection with the embodiments disclosed herein may be implemented as electronic hardware, computer software or combinations of both. To clearly illustrate this interchangeability of hardware and software, various illustrative components, blocks, modules, circuits and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the embodiments disclosed herein may be implemented or performed with a general purpose processor, a digital signal processor (DSP), an application specific integrated circuit (ASIC), a filed programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional process, control, microcontroller, or state machine. A process may also be implemented as a combination of computing devices, e.g., a combination of a DSP and a microprocessor, a plurality of microprocessors, one or more microprocessors in conjunction with a DSP core, or any other such configuration.

In one or more exemplary embodiments, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

The previous description of the disclosed aspects is provided to enable any person skilled in the art to make or use the present disclosure. Various modifications to these aspects will be readily apparent to those skilled in the art, and the generic principles defined herein may be applied to other aspects without departing from the disclosure. Thus, the present disclosure is not intended to be limited to the aspects shown herein but is to be accorded the widest scope consistent with the principles and novel features disclosed herein.

What is claimed is:

1. A method of system acquisition at a wireless device while maintaining a defined battery life span, comprising:
   determining a level of remaining battery power upon entering a defined service state associated with acquisition attempts; and
   setting a first duty cycle time of acquisition attempts such that the remaining battery power lasts for the defined battery life span while the wireless device is in the defined service state, wherein the defined battery life span is defined as an amount of time the battery, when fully charged, can power the wireless device performing acquisition using a second duty cycle time.

2. The method of claim 1, wherein the first duty cycle time comprises a search time and a sleep time.

3. The method of claim 2, the determining the first duty cycle time comprising adjusting the sleep time relative to the search time such that the level of remaining battery power lasts for the defined battery life span.

4. The method of claim 2, the determining the first duty cycle time comprising adjusting the search time relative to the sleep time such that the level of remaining battery power lasts for the defined battery life span.

5. The method of claim 2, the determining the first duty cycle time comprising adjusting both the search time and the sleep time such that the level of remaining battery power lasts for the defined battery life span.

6. The method of claim 2, wherein at least one of a full scan and a micro scan is performed during the search time.

7. The method of claim 2, further comprising:
attempting to acquire service via at least one channel on a preferred roaming list that includes a most recently used (MRU) list of channels, wherein the at least one channel is selected based on a smart puncturing of channels on the MRU list at predetermined intervals during the search time.

8. The method of claim 6, wherein the full scan comprises:
attempting to acquire service via at least one channel on a preferred roaming list previously stored in the wireless device without determining a radio frequency (RF) power of the at least one channel.

9. The method of claim 8, wherein the at least one channel on the preferred roaming list is prioritized based on proximity to the wireless device.

10. The method of claim 8, wherein the at least one channel on the preferred roaming list is prioritized based on recent use thereof by the wireless device.

11. The method of claim 8, wherein the at least one channel on the preferred roaming list comprises a plurality of channels that are prioritized based on recent use thereof by the wireless device and based on a geographical location of the wireless device.

12. The method of claim 8, wherein the micro scan comprises:
determining a radio frequency (RF) power of a channel;
determining whether the RF power of the channel is below a predetermined threshold; and
attempting to acquire service via the channel if the RF power of the channel is not below the predetermined threshold.

13. The method of claim 12, wherein the channel for which the RF power is determined is chosen based on a preferred roaming list previously stored in the wireless device.

14. The method of claim 13, wherein one or a plurality of channels on the preferred roaming list are prioritized based on proximity to the wireless device.

15. The method of claim 13, wherein one or a plurality of channels on the preferred roaming list are prioritized based on recent use thereof by the wireless device.

16. The method of claim 6, further comprising switching from the full scan to the micro scan during the search time.

17. The method of claim 1 further comprising:
obtaining a user-provided input selecting an alternate channel responsive to poor channel conditions on a currently selected channel; and
attempting to acquire service on the alternate channel.

18. The method of claim 1, wherein the defined service state comprises an out of service state.

19. The method of claim 1, wherein:
the first duty cycle time comprises a conserving duty cycle time; and
the second duty cycle time comprise a conventional duty cycle time.

20. The method of claim 19, further comprising obtaining a user-provided input defining a desired frequency of reacquisition attempts;
setting the first duty cycle includes setting the first duty cycle based at least in part on the desired frequency of reacquisition attempts.

21. The method of claim 1, wherein the first duty cycle time is defined by the following equation:

$$t_{Duty} = \left[\frac{[I_a \times t_a + I_s \times t_s]t_{Total}}{Q_{Rem}}\right];$$

where:
$t_{Duty}$ is the first duty cycle time;
$t_a$ is an acquisition search time within the first duty cycle time;
$t_s$ is a sleep time within the first duty cycle time;
$t_{Total}$ is the defined battery life span;
$I_a$ is a current used during the acquisition search time;
$I_s$ is a current used during the sleep time; and
$Q_{Rem}$ is the level of remaining battery power.

22. An apparatus for channel acquisition at a wireless device while maintaining a defined battery life span, comprising:
a power control unit configured to determine a level of remaining battery power upon entering a defined service state associated with acquisition attempts; and
a processor configured to set a first duty cycle time of acquisition attempts such that the level of remaining battery power lasts for the defined battery life span while the wireless device is in the defined service state, wherein the defined battery life span is defined as an amount of time the battery, when fully charged, can power the apparatus performing acquisition using a second duty cycle time.

23. The apparatus of claim 22, wherein the first duty cycle time comprises a search time and a sleep time.

24. The apparatus of claim 23, wherein the processor is further configured to attempt to acquire service via at least one channel on a preferred roaming list that includes a most recently used (MRU) list of channels, and wherein the at least one channel is selected based on a smart puncturing of channels on the MRU list at predetermined intervals during the search time.

25. The apparatus of claim 23, the processor determining the first duty cycle time by adjusting the sleep time relative to the search time such that the level of remaining battery power lasts for the defined battery life span.

26. The apparatus of claim 23, the processor determining the first duty cycle time by adjusting the search time relative to the sleep time such that the level of remaining battery power lasts for the defined battery life span.

27. The apparatus of claim 23, the processor determining the first duty cycle time by adjusting both the search time and the sleep time such that the level of remaining battery power lasts for the defined battery life span.

28. The apparatus of claim 23, wherein at least one of a full scan and a micro scan is performed during the search time.

29. The apparatus of claim 28, wherein the full scan attempts to acquire service via at least one channel on a preferred roaming list previously stored in the wireless device without determining a radio frequency (RF) power of the at least one channel.

30. The apparatus of claim 29, wherein the at least one channel on the preferred roaming list is prioritized based on proximity to the wireless device.

31. The apparatus of claim 29, wherein the at least one channel on the preferred roaming list is prioritized based on recent use thereof by the wireless device.

32. The apparatus of claim 28, wherein the micro scan determines a radio frequency (RF) power of a channel, determines whether the RF power of the channel is below a predetermined threshold and attempts to acquire service via the channel if the RF power of the channel is not below the predetermined threshold.

33. The apparatus of claim 32, wherein the channel for which the RF power is determined is chosen based on a preferred roaming list previously stored in the wireless device.

34. The apparatus of claim 33, wherein at least one channel on the preferred roaming list is prioritized based on proximity to the wireless device.

35. The apparatus of claim 33, wherein at least one channel on the preferred roaming list is prioritized based on recent use thereof by the wireless device.

36. The apparatus of claim 28, further comprising a processor for switching from the full scan to the micro scan during the search time.

37. An apparatus for channel acquisition at a wireless device while maintaining a defined battery life span, comprising:
means for determining a level of remaining battery power upon entering a defined service state associated with acquisition attempts; and
means for setting a first duty cycle time of acquisition attempts such that the level of remaining battery power lasts for the defined battery life span while the wireless device is in the defined service state, wherein the defined battery life span is defined as an amount of time the battery, when fully charged, can power the apparatus performing acquisition using a second duty cycle time.

38. The apparatus of claim 37, wherein the first duty cycle time comprises a search time and a sleep time.

39. The apparatus of claim 38, the means for determining a first duty cycle time comprising means for adjusting the sleep time relative to the search time such that the level of remaining battery power lasts for the defined battery life span.

40. The apparatus of claim 38, the means for determining a first duty cycle time comprising means for adjusting the search time relative to the sleep time such that the level of remaining battery power lasts for the defined battery life span.

41. The apparatus of claim 38, the means for determining a first duty cycle time comprising means for adjusting both the search time and the sleep time such that the level of remaining battery power lasts for the defined battery life span.

42. The apparatus of claim 38, wherein at least one of a full scan and a micro scan is performed during the search time.

43. The apparatus of claim 38, further comprising:
means for attempting to acquire service via at least one channel on a preferred roaming list that includes a most recently used (MRU) list of channels, wherein the at least one channel is selected based on a smart puncturing of channels on the MRU list at predetermined intervals during the search time.

44. The apparatus of claim 42, wherein the full scan attempts to acquire service via at least one channel on a preferred roaming list previously stored in the wireless device without determining a radio frequency (RF) power of the at least one channel.

45. The apparatus of claim 44, wherein the at least one channel on the preferred roaming list is prioritized based on proximity to the wireless device.

46. The apparatus of claim 44, wherein the at least one channel on the preferred roaming list is prioritized based on recent use thereof by the wireless device.

47. The apparatus of claim 42, wherein the micro scan determines a radio frequency (RF) power of a channel, determines whether the RF power of the channel is below a predetermined threshold and attempts to acquire service via the channel if the RF power of the channel is not below the predetermined threshold.

48. The apparatus of claim 47, wherein the channel for which the RF power is determined is chosen based on a preferred roaming list previously stored in the wireless device.

49. The apparatus of claim 48, wherein at least one channel on the preferred roaming list is prioritized based on proximity to the wireless device.

50. The apparatus of claim 48, wherein at least one channel on the preferred roaming list is prioritized based on recent use thereof by the wireless device.

51. The apparatus of claim 42, further comprising means for switching from the full scan to the micro scan during the search time.

52. A non-transitory computer-readable medium storing instructions thereon for channel acquisition at a wireless device while maintaining a defined battery life span, comprising:
determining a level of remaining battery power upon entering a defined service state associated with acquisition attempts; and
setting a first duty cycle time of acquisition attempts such that the level of remaining battery power lasts for the defined battery life span while the wireless device is in the defined service state, wherein the defined battery life span is defined as an amount of time the battery, when fully charged, can power the wireless device performing acquisition using a second duty cycle time.

53. The computer-readable medium of claim 52, wherein the first duty cycle time comprises a search time and a sleep time.

54. The computer-readable medium of claim 53, the determining a first duty cycle time comprising adjusting the sleep time relative to the search time such that the level of remaining battery power lasts for the defined battery life span.

55. The computer-readable medium of claim 53, the determining a first duty cycle time comprising means for adjusting the search time relative to the sleep time such that the level of remaining battery power lasts for the defined battery life span.

56. The computer-readable medium of claim 53, the determining a first duty cycle time comprising adjusting both the search time and the sleep time such that the level of remaining battery power lasts for the defined battery life span.

57. The computer-readable medium of claim 53, wherein at least one of a full scan and a micro scan is performed during the search time.

58. The computer-readable medium of claim 53, further storing instructions comprising:
attempting to acquire service via at least one channel on a preferred roaming list that includes a most recently used (MRU) list of channels, wherein the at least one channel is selected based on a smart puncturing of channels on the MRU list at predetermined intervals during the search time.

59. The computer-readable medium of claim 57, wherein the full scan attempts to acquire service via at least one channel on a preferred roaming list previously stored in the wireless device without determining a radio frequency (RF) power of the at least one channel.

60. The computer-readable medium of claim 59, wherein the at least one channel on the preferred roaming list is prioritized based on proximity to the wireless device.

61. The computer-readable medium of claim 59, wherein the at least one channel on the preferred roaming list is prioritized based on recent use thereof by the wireless device.

62. The computer-readable medium of claim 57, wherein the micro scan determines a radio frequency (RF) power of a channel, determines whether the RF power of the channel is below a predetermined threshold and attempts to acquire service via the channel if the RF power of the channel is not below the predetermined threshold.

63. The computer-readable medium of claim 62, wherein the channel for which the RF power is determined is chosen based on a preferred roaming list previously stored in the wireless device.

64. The computer-readable medium of claim 63, wherein at least one channel on the preferred roaming list is prioritized based on proximity to the wireless device.

65. The computer-readable medium of claim 63, wherein at least one channel on the preferred roaming list is prioritized based on recent use thereof by the wireless device.

66. The computer-readable medium of claim 57, further comprising switching from the full scan to the micro scan during the search time.

67. A processor configured to execute instructions for channel acquisition at a wireless device while maintaining a defined battery life span, the instructions comprising:
   determining a level of remaining battery power upon entering a defined service state associated with acquisition attempts; and
   setting a first duty cycle time of acquisition attempts such that the level of remaining battery power lasts for the defined battery life span while the wireless device is in the defined service state, wherein the defined battery life span is defined as an amount of time the battery, when fully charged, can power the wireless device performing acquisition using a second duty cycle time.

68. The processor of claim 67, wherein the first duty cycle time comprises the search time and the sleep time.

69. The processor of claim 68, the instructions for determining the first duty cycle time comprising adjusting the sleep time relative to the search time such that the level of remaining battery power lasts for the defined battery life span.

70. The processor of claim 68, the instructions for determining the first duty cycle time comprising means for adjusting the search time relative to the sleep time such that the level of remaining battery power lasts for the defined battery life span.

71. The processor of claim 68, the instructions for determining the first duty cycle time comprising adjusting both the search time and the sleep time such that the level of remaining battery power lasts for the defined battery life span.

72. The processor of claim 68, the instructions further comprising:
   attempting to acquire service via at least one channel on a preferred roaming list that includes a most recently used (MRU) list of channels, wherein the at least one channel is selected based on a smart puncturing of channels on the MRU list at predetermined intervals during the search time.

73. The processor of claim 68, wherein at least one of a full scan and a micro scan is performed during the search time.

74. The processor of claim 73, wherein the full scan attempts to acquire service via at least one channel on a preferred roaming list previously stored in the wireless device without determining a radio frequency (RF) power of the at least one channel.

75. The processor of claim 74, wherein the at least one channel on the preferred roaming list is prioritized based on proximity to the wireless device.

76. The processor of claim 74, wherein the at least one channel on the preferred roaming list is prioritized based on recent use thereof by the wireless device.

77. The processor of claim 73, wherein the micro scan determines a radio frequency (RF) power of a channel, determines whether the RF power of the channel is below a predetermined threshold and attempts to acquire service via the channel if the RF power of the channel is not below the predetermined threshold.

78. The processor of claim 77, wherein the channel for which the RF power is determined is chosen based on a preferred roaming list previously stored in the wireless device.

79. The processor of claim 78, wherein one or a plurality of channels on the preferred roaming list are prioritized based on proximity to the wireless device.

80. The processor of claim 78, wherein one or a plurality of channels on the preferred roaming list are prioritized based on recent use thereof by the wireless device.

81. The processor of claim 73, the instructions further comprising switching from the full scan to the micro scan during the search time.

\* \* \* \* \*